United States Patent
Campbell et al.

(10) Patent No.: US 9,753,910 B2
(45) Date of Patent: *Sep. 5, 2017

(54) REPRESENTATION OF PEOPLE IN A SPREADSHEET

(71) Applicant: Microsoft Technology Licensing, LLC, Redmond, WA (US)

(72) Inventors: John Campbell, Renton, WA (US); Mark Knight, Bellevue, WA (US); Can Comertoglu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,775

(22) Filed: Aug. 13, 2015

(65) Prior Publication Data

US 2015/0347373 A1 Dec. 3, 2015

Related U.S. Application Data

(63) Continuation of application No. 13/012,335, filed on Jan. 24, 2011, now Pat. No. 9,129,234.

(51) Int. Cl.
*G06F 3/00* (2006.01)
*G06F 17/24* (2006.01)
(Continued)

(52) U.S. Cl.
CPC .......... *G06F 17/246* (2013.01); *G06F 3/0482* (2013.01); *G06F 3/04842* (2013.01);
(Continued)

(58) Field of Classification Search
CPC .. G06F 17/246; G06F 3/0482; G06F 3/04842; G06Q 10/06; G06Q 10/10; G06Q 50/01; H04L 65/403
See application file for complete search history.

(56) References Cited

U.S. PATENT DOCUMENTS 6,138,130 A 10/2000 Adler et al. ............. 715/210
6,157,934 A 12/2000 Khan et al.
(Continued)

FOREIGN PATENT DOCUMENTS

CN 1609866 A 4/2005
CN 1755679 A 4/2006
(Continued)

OTHER PUBLICATIONS

Cheung, S.L., "Using mobile phone messaging as a response medium in classroom experiments", The Journal of Economic Education 39.1 (2008): pp. 51-67, [retrieved from internet on Mar. 29, 2016] <URL: https://cyfar.org/sites/default/files/Cheung%202008.pdf>.
(Continued)

*Primary Examiner* — Kyle Stork

(57) ABSTRACT

A spreadsheet includes a native spreadsheet object that represents a person. The person object may be used within a spreadsheet just as any other spreadsheet objects are utilized. For example, the person object may be integrated with spreadsheet formulas and other spreadsheet objects such as charts, tables, pivot tables, sheets, and the like. Spreadsheet formulas may perform operations specific to a person object (e.g. send message, get contact information, get status, get other person specific information, sort, and the like). Common actions may be associated with the person object, such as initiating communication with the person represented by the person object (e.g. phone call, email, text message, collaboration invite, and the like). Social networking information may also be associated with a person object. For example, social networking posts may be included within a spreadsheet, a user may post to a social network from the spreadsheet, and the like.

20 Claims, 13 Drawing Sheets

(51) Int. Cl.
*H04L 29/06* (2006.01)
*G06F 3/0484* (2013.01)
*G06F 3/0482* (2013.01)
*G06Q 10/06* (2012.01)
*G06Q 50/00* (2012.01)
*G06Q 10/10* (2012.01)

(52) U.S. Cl.
CPC ............ *G06Q 10/06* (2013.01); *G06Q 10/10* (2013.01); *G06Q 50/01* (2013.01); *H04L 65/403* (2013.01)

(56) References Cited

U.S. PATENT DOCUMENTS

| | | |
|---|---|---|
| 6,292,810 B1 | 9/2001 | Richards |
| 6,323,853 B1 | 11/2001 | Hedloy |
| 6,829,615 B2 | 12/2004 | Schirmer et al. |
| 7,084,758 B1 | 8/2006 | Cole ............... 340/539.11 |
| 7,099,890 B2 | 8/2006 | Cahill et al. |
| 7,155,665 B1 | 12/2006 | Browne et al. ............ 715/243 |
| 7,336,942 B2 | 2/2008 | Wang |
| 7,433,967 B2 | 10/2008 | Anson et al. ............... 709/240 |
| 7,783,645 B2 | 8/2010 | Hess et al. ................. 707/751 |
| 7,930,626 B2 | 4/2011 | Serra et al. |
| 8,032,125 B2 | 10/2011 | Wisebourt et al. |
| 8,219,028 B1 | 7/2012 | Flamholz |
| 8,332,878 B2 | 12/2012 | Harm |
| 8,964,947 B1 | 2/2015 | Noolu |
| 9,129,234 B2 | 9/2015 | Campbell et al. |
| 9,330,080 B2 | 5/2016 | Muenkel |
| 2002/0091730 A1 | 7/2002 | Bedford et al. |
| 2002/0143780 A1 | 10/2002 | Gorman |
| 2003/0144793 A1 | 7/2003 | Melaku et al. |
| 2003/0200308 A1 | 10/2003 | Tameda et al. |
| 2003/0226105 A1 | 12/2003 | Waldau ................. 715/212 |
| 2004/0038664 A1 | 2/2004 | Stoks ................. 455/404.1 |
| 2005/0097447 A1 | 5/2005 | Serra et al. |
| 2005/0246339 A1 | 11/2005 | Kamegaya et al. |
| 2005/0273695 A1 | 12/2005 | Schnurr |
| 2006/0004727 A1 | 1/2006 | Antilla et al. |
| 2006/0099966 A1 | 5/2006 | Moton et al. ............. 455/456.3 |
| 2006/0218029 A1 | 9/2006 | Chin ................... 705/8 |
| 2007/0029956 A1 | 2/2007 | Hofer |
| 2007/0050699 A1 | 3/2007 | Simkhay et al. |
| 2007/0075965 A1 | 4/2007 | Huppi et al. |
| 2007/0136666 A1 | 6/2007 | Khen et al. |
| 2007/0219956 A1 | 9/2007 | Milton |
| 2008/0016436 A1 | 1/2008 | Liu |
| 2008/0016440 A1 | 1/2008 | Liu |
| 2008/0071467 A1 | 3/2008 | Johnson et al. |
| 2008/0125981 A1 | 5/2008 | Steinke |
| 2008/0132251 A1 | 6/2008 | Altman et al. |
| 2008/0134030 A1 | 6/2008 | Kansal et al. |
| 2008/0162198 A1 | 7/2008 | Jabbour et al. |
| 2008/0171559 A1 | 7/2008 | Frank et al. ............... 455/456.5 |
| 2008/0182599 A1 | 7/2008 | Rainisto et al. |
| 2008/0235349 A1 | 9/2008 | Caspi et al. |
| 2009/0044095 A1 | 2/2009 | Berger |
| 2009/0112937 A1 | 4/2009 | Campbell et al. |
| 2009/0112990 A1 | 4/2009 | Campbell |
| 2009/0143056 A1 | 6/2009 | Tang |
| 2009/0172553 A1 | 7/2009 | Sikka et al. ................. 715/733 |
| 2009/0177744 A1 | 7/2009 | Marlow et al. |
| 2009/0307190 A1 | 12/2009 | Maresca |
| 2009/0313250 A1 | 12/2009 | Folting et al. |
| 2009/0319616 A1 | 12/2009 | Lewis et al. |
| 2010/0069096 A1 | 3/2010 | Poola et al. |
| 2010/0115035 A1 | 5/2010 | Malhar et al. |
| 2010/0128855 A1 | 5/2010 | Demo |
| 2010/0205269 A1 | 8/2010 | Poozhiyil et al. |
| 2010/0306179 A1 | 12/2010 | Lim |
| 2011/0145739 A1 | 6/2011 | Berger et al. |
| 2011/0243125 A1 | 10/2011 | Kaal |
| 2011/0252320 A1 | 10/2011 | Arrasvuori et al. |
| 2011/0264648 A1 | 10/2011 | Gulik et al. |
| 2012/0023390 A1 | 1/2012 | Howes et al. |
| 2012/0072494 A1 | 3/2012 | Wong et al. |
| 2012/0072855 A1 | 3/2012 | Baldwin et al. |
| 2012/0131645 A1 | 5/2012 | Harm |
| 2012/0144300 A1 | 6/2012 | Harm |
| 2012/0151314 A1 | 6/2012 | Campbell et al. |
| 2012/0151315 A1 | 6/2012 | Campbell et al. |
| 2012/0192050 A1 | 7/2012 | Campbell et al. |
| 2013/0007118 A1 | 1/2013 | Rochelle et al. |

FOREIGN PATENT DOCUMENTS

| | | |
|---|---|---|
| CN | 1794231 A | 6/2006 |
| CN | 101454774 A | 6/2009 |
| CN | 102725750 A | 10/2012 |
| JP | 06301446 A | 10/1994 |
| JP | 2001-109810 A | 4/2001 |
| JP | 2003032718 A | 1/2003 |
| JP | 2004-208278 A | 7/2004 |
| JP | 2005122575 A | 5/2005 |
| JP | 2005316714 A | 11/2005 |
| JP | 2008-082883 A | 4/2008 |
| RU | 2358312 C2 | 6/2009 |
| RU | 2387003 C2 | 4/2010 |
| WO | WO 2010/115204 | 10/2010 |
| WO | 2011084416 A2 | 7/2011 |

OTHER PUBLICATIONS

SMS & Co, "SMSLibX—SMS tutorials—Sending SMS from Excel", [retrieved from internet on Mar. 29, 2016] <URL: https://web.archive.org/web/20101112005436/http://www.smsco.it/tomcat/en/sms_tutorials/sms_from_excel.jsp> published on Nov. 12, 2010 as per Wayback Machine.
SMS & Co, "SendSMS_multi.xls", [retrieved from internet on Mar. 29, 2016] <URL: https://web.archive.org/web/20101112005436/http://www.smsco.it/tomcat/download/sms_tutorials/SMSLibX_with_Excel.zip> published on Nov. 12, 2010 as per Wayback Machine.
Chinese Notice on Grant dated Jun. 25, 2015 cited in Appl. No. 201210019825.9, w/English language translation, 4 pgs.
Russian Office Action Issued in Russian Patent Application No. 2013127117, Mailed Date: Nov. 26, 2015, 6 Pages. (w/o English Translation).
Japanese Office Action Issued in Patent Application No. 2013-544537, Mailed Date: Jan. 5, 2016, 4 Pages.
Japanese Office Action Issued in Patent Application No. 2013-544541 Mailed Date: Jan. 6, 2016, 6 Pages.
Australian Office Action Issued in Patent Application No. 2011341505 Mailed Date: Mar. 29, 2016, 5 Pages.
European Office Action Issued in Patent Application No. 12739904.6 Mailed Date: Mar. 22, 2016, 7 Pages.
U.S. Appl. No. 12/967,991, filed Dec. 14, 2010, entitled "*Using Text Messages to Interact with Spreadsheets*".
U.S. Appl. No. 13/012,335, filed Jan. 24, 2011, entitled "*Representation of People in a Spreadsheet*".
U.S. Appl. No. 12/967,972, filed Dec. 14, 2010, entitled "*Location Aware Spreadsheet Actions*".
AppShopper.com; Geofence—Published Date: Sep. 24, 2010; http://appshopper.com/productivity/location-based-reminder; 3 pgs.
Choi, et al.; Multi-Paradigm Spreadsheet for End Users—Published Date: Apr. 2006; http://paper.ijcsns.org/07_book/200604/200604A06.pdf; 6 pgs.
GroupSMSIndia.com; Excel Plug-In—Retrieved Date: Oct. 13, 2010; http://www.groupsmsindia.com/excel-plugin.html; 1 pg.
J. Walk & Associates, Inc.; Sending Personalized Email From Excel—Retrieved Date: Oct. 18, 2010; http://spreadsheetpage.com/index.php/tip/sending_personalized_email_from_excel/; 3 pgs.
Lieberman, et al.; "Spatio-Textual Spreadsheets: Geotagging via Spatial Coherence"; Nov. 4-6, 2009, ACM, pp. 524-527.
Microsoft "How to convert degrees/minutes/seconds angles to or from decimal angles in Excel 2000"; Microsoft, Nov. 23, 2006; 3 pgs.

(56) References Cited

OTHER PUBLICATIONS

Nayyeri, K.; Use ExcelPackage to Manipulate Open XML Excel Files—Published Date: Dec. 6, 2008; http://nayyeri.net/use-excelpackage-to-manipulate-open-xml-excel-files; 6 pgs.
Noyes, K.; Google Latitude Lets Users Follow Their Own Footprints—Published Date: Nov. 11, 2009; TechNewsWorld; http://mashable.com/2009/11/10/google-latitude-features/; 3 pgs.
Obrenovic, et al.; End-User Service Computing: Spreadsheets as a Service Composition Tool—Published Date: Dec. 17, 2008; http://citeseerx.ist.psu.edu/viewdoc/download?doi=10.1.1.154.7998&rep=rep1&type=pdf; 14 pgs.
PageOne, "SMS plug-in for Microsoft® Excel®: User Guide", Version 3.0; 30pgs, 33 pgs.; http://www.pageone.co.uk/downloads/guides/SMS_Plug-in_Excel_User_Guide_v3.0.pdf; published Mar. 9, 2010 shown using Wayback Archive documentation, pp. 1-3; http://web.archive.org/web/20100309003140/http://www.pageone.co.uk/support/down loads/manuals-and-guides.
PageOne.Co.Uk; 2 Way SMS from Your PC—Retrieved Date: Oct. 13, 2010; http://www.pageone.co.uk/services/connect/excel-plug-in; 1 pg.
PCWorld.com; Location-Based Mobile Service Helps You Remember—Published Date: May 5, 2009; http://www.pcworld.com/article/164309/locationbased_mobile_service_helps_you_remember.html; 4 pgs.
SMS & Co.; Sending SMS from Excel—Retrieved Date: Oct. 13, 2010; http://www.smsco.it/en/sms_tutorials/sms_from_exce.jsp; 3 pgs.
SMSCountry SMS-Excel Plugin—Retrieved Date: Oct. 13, 2010; http://www.smscountry.com/excel_download_info.asp; 2 pgs.
StrikeIronBlog; Using Microsoft Excel to Send an SMS Text Message to a List of Recipients—Published Date: Jul. 11, 2009; http://strikeiron.typepad.com/strikeiron_blog/2009/07/using-microsoft-excel-to-send-an-sms-text-message-to-a-list-of-recipients.html; 2 pgs.
TriangleDigital.com; Global Positioning System—Published Date: Apr. 19, 2010; http://www.triangledigital.com/man2020f/ch7gps.htm; 4 pgs.
Zimbio.com; Sending SMS messages from Excel Must See—Published Date: Apr. 11, 2010; http://www.zimbio.com/Microsoft+Excel/articles/6gU4ZZCoRbt/Sending+SMS+messages+Excel+Must+See; 9 pgs.
OpenOffice.org, "Sorting and Filtering Data," Dec. 8, 2006, pp. 331-339 + 1 page, http://openoffice.blogs.com/bookresources/chapters/book_calcsortingfiltering.pdf http://openoffice.blogs.com/bookresources/2006/12/free_openoffice.html.
Greentext, "SMSbroadcast," 1 page, published as early as Sep. 28, 2010 shown using Wayback Archive, http://web.archive.org/web/20100928002328/http://www.gntext.com/Applications/SMSBroadcast.aspx.
International Search Report mailed Jun. 18, 2012, in PCT/US2011/063199, 10 pgs.
International Search Report mailed Jul. 31, 2012, in PCT/US2011/063099, 9 pgs.
International Search Report mailed Jul. 31, 2012, in PCT/US2012/022136, 10 pgs.
Chinese First Office Action dated Jan. 6, 2014 cited in Appl. No. 201210019825.9, w/ English language translation, 9 pgs.
Chinese First Office Action dated Jan. 9, 2014 cited in Appl. No. 201110436694.X, w/English language translation, 18 pgs.
Chinese First Office Action dated Jan. 30, 2014 cited in Appl. No. 201110436744.4, w/ English language translation, 13 pgs.
Chinese Second Office Action dated Jun. 17, 2014 cited in Appl. No. 201210019825.9, w/ English language translation, 12 pgs.
Chinese Section Office Action dated Jul. 14, 2014 cited in Appl. No. 201110436694.X, w/English language translation, 16 pgs.
Chinese Second Office Action dated Sep. 12, 2014 cited in Appl. No. 201110436744.4, w/English language translation, 6 pgs.
Extended European Supplementary Search Report dated Sep. 23, 2014 cited in Appl. No. 12739904.6, 6 pgs.
Chinese Third Office Action dated Dec. 10, 2014 cited in Appl. No. 201210019825.9, w/ English language translation, 8 pgs.
Chinese Third Office Action dated Dec. 31, 2014 cited in Appl. No. 201110436694.X, w/ English language translation, 13 pgs.
Chinese Fourth Office Action dated Apr. 27, 2015 cited in Appl. No. 201110436694.X, w/ English language translation, 13 pgs.
Office Action dated Jun. 20, 2012 cited in U.S. Appl. No. 13/012,335; 15 pgs.
Final Office Action dated Oct. 2, 2012 cited in U.S. Appl. No. 13/012,335; 15 pgs.
Office Action dated Jun. 5, 2013 cited in U.S. Appl. No. 12/967,972; 18 pgs.
Office Action dated Jul. 2, 2013 cited in U.S. Appl. No. 12/967,991; 22 pgs.
Office Action dated Oct. 29, 2013 cited in U.S. Appl. No. 13/012,335; 15 pgs.
Final Office Action dated Dec. 20, 2013 cited in U.S. Appl. No. 12/967,972, 24 pgs.
Final Office Action dated Feb. 19, 2014 cited in U.S. Appl. No. 12/967,991, 31 pgs.
Final Office Action dated Jun. 11, 2014 cited in U.S. Appl. No. 13/012,335, 15 pgs.
Office Action dated Nov. 3, 2014 cited in U.S. Appl. No. 13/012,335, 28 pgs.
Office Action dated Feb. 2, 2015 cited in U.S. Appl. No. 12/967,972, 37 pgs.
Office Action dated Feb. 2, 2015 cited in U.S. Appl. No. 12/967,991, 52 pgs.
Notice of Allowance dated Apr. 24, 2015 cited in U.S. Appl. No. 13/012,335, 35 pgs.
Office Action dated Jun. 2, 2015 cited in U.S. Appl. No. 12/967,972, 23 pgs.
Office Action dated Jun. 4, 2015 cited in U.S. Appl. No. 12/967,991, 35 pgs.
Office Action Issued in Australian Patent Application No. 2011341497, Mailed Date: Mar. 30, 2016, 5 pages.
Australian Office Action Issued in Patent Application No. 2011341505, Mailed Date: May 9, 2016, 4 pages.
Chinese Fifth Office Action dated Apr. 5, 2016 cited in Appl. No. 201110436694.X, with English translation, 7 pgs.
Japanese Office Action Issued in Patent Application No. 2013-544537, Mailed Date: Apr. 26, 2016, without English translation, 3 pages.
U.S. Appl. No. 12/967,991 Office Action dated Jun. 16, 2016, 33 pgs.
Australian Office Action Issued in Patent Application No. 2011341505, Mailed Date: Jun. 14, 2016, 4 pages.
Russian Notice of Allowance Issued in Patent Application No. 2013127120, Mailed Date: May 24, 2016, 18 pages.
Hong Kong Certificate of Grant issued in Patent Application No. 13101087.7, mailed May 27, 2016, 3 pages.
Baycon Group, Lesson 4: Sorting, Filtering, and Creating Relationships, online as of Jan. 2, 2010, 11 pages.
Russian Office Action Issued in Patent Application No. 2013127117, Mailed Date: Jun. 10, 2016, without English translation, 6 pages.
Microsoft Press, "Microsoft Computer Dictionary: S", published Mar. 15, 2002, Microsoft Press, 67 pgs.
Chinese Notice on Grant dated Jan. 20, 2015 cited in Appl. No. 201110436744.4, w/English language translation, 4 pgs.
Chinese Decision on Rejection dated Oct. 10, 2015 cited in Appl. No. 201110436694.X, w/ English language translation, 14 pgs.
Russian Office Action Issued in Patent Application No. 2013127120, Mailed Date: Nov. 11, 2015, 6 Pages. (W/O English Translation).
Australian Notice of Acceptance Issued in Patent Application No. 2011341505 Dated: Jul. 19, 2016, 2 Pages.
Australian Notice of allowance Issued in Patent Application No. 2011341497, Mailed Date: Jun. 8, 2016, 2 Pages.
Chinese Office Action and Search Report Issued in Patent Application No. 201110436694.X, Mailed Date: Jul. 14, 2016, 16 Pages.
U.S. Appl. No. 12/967,972 Office Action dated Jun. 29, 2016, 42 pages.

(56) References Cited

OTHER PUBLICATIONS

Japanese Office Action Issued in Patent Application No. 2013-544541 Mailed Date: Aug. 8, 2016, with English translation, 6 pages.
Russian Notice of Allowance in Application 2013127117, mailed Sep. 22, 2016, 18 pages.
Chinese Notice of Allowance in Application 201110436694.X, mailed Nov. 15, 2016, 4 pages.
U.S. Appl. No. 12/967,972, Office Action mailed Dec. 9, 2016, 20 pgs.
U.S. Appl. No. 12/967,991, Notice of Allowance mailed Dec. 19, 2016, 16 pgs.
Le Bodie, Gwenael, "Mobile Messaging Technologies and Services SMS, EMS and MMS", 2005, John Kiley & Son, Second Ed., 455 pgs.
"Novak et al., "MMS-Building on the success of SMS", Ericsson, 2001, pp. 102-109,https://www.ericsson.com/ericsson/corpinfo/publications/review/2001_03/files/2001031.pdf".
Wakefield et al "Introduction to Mobile Communications: Technology, Services, Markets", Auerbach Publications, 2007, 437 pgs.
Mobile Streams, "Next Messaging: An Introduction to SMS, EMS and MMS", 2000, 25 pages.
ACM, "From e-commerce tom-commerce: the power of the mobile internet: References", ACM, 3 pages, http://dl.acm.org/citation.cfm?id=644418.
U.S. Appl. No. 12/967,972, Advisory Action dated Feb. 27, 2017, 3 pgs.
U.S. Appl. No. 12/967,991, Notice of Allowance dated Feb. 9, 2017, 5 pgs.
U.S. Appl. No. 12/967,972, Notice of Allowance dated Jun. 30, 2017, 17 pgs.

REPRESENTATION OF PEOPLE IN A SPREADSHEET

CROSS-REFERENCE TO RELATED APPLICATIONS

This application is a continuation application of U.S. patent application Ser. No. 13/012,335, (now U.S. Pat. No. 9,129,234), entitled "REPRESENTATION OF PEOPLE IN A SPREADSHEET," filed on Jan. 24, 2011, the entire disclosure of which is hereby incorporated herein by reference.

BACKGROUND

Many people utilize spreadsheets to interact with data. Many of these uses are centered around people. For example, a user may use spreadsheets for generating reports, tracking status of different work items assigned to other people, interacting with charts and tables, collaborating with other users, and the like. Connecting these tasks with users can be cumbersome. For instance, a user may need to use different programs to email users tasks within the program for which they are responsible or lookup more detailed user information from one or more other programs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A spreadsheet includes a spreadsheet person object that represents a person. The person object may be used within a spreadsheet just as any other spreadsheet objects are utilized. For example, the person object may be integrated within spreadsheet formulas and other spreadsheet objects such as charts, tables, pivot tables, sheets, and the like. Spreadsheet formulas may perform operations specific to a person object (e.g. send message, get contact information, get status, get other person specific information, sort based on person information, and the like). Common actions may be associated with the person object, such as initiating communication with the person represented by the person object (e.g. phone call, email, text message, collaboration invite, and the like). Social networking information may also be associated with a person object. For example, social networking posts may be included within a spreadsheet, a user may post to a social network from the spreadsheet, and the like.

DETAILED DESCRIPTION

Figure 1:
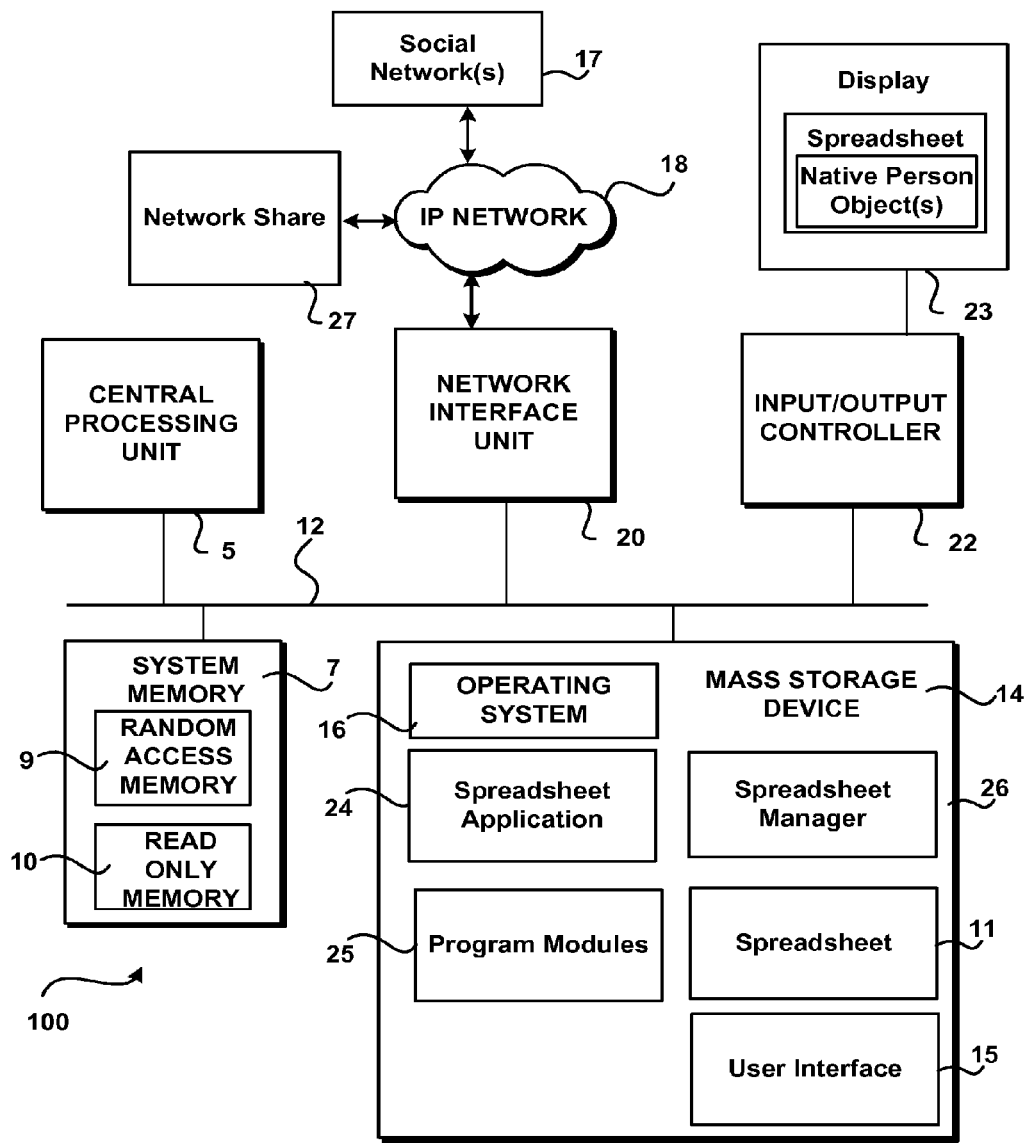
FIG. 1 illustrates an exemplary computing environment.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer environment for a computer 100 utilized in the various embodiments will be described. The computer environment shown in FIG. 1 includes computing devices that each may be configured as a server, a desktop or mobile computer, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, spreadsheet 11, spreadsheet application 24, other program modules 25, and spreadsheet manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide input/output to an IP phone, a display screen 23, a printer, or other type of output device.

As mentioned briefly above, a number of program modules and data files may be stored in the mass storage device 14 and RAM 9 of the computer 100, including an operating system 16 suitable for controlling the operation of a computer, such as WINDOWS SERVER® or the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs, including a spreadsheet application 24 and program modules 25. According to an embodiment, the spreadsheet application 24 is the MICROSOFT EXCEL spreadsheet application. Other spreadsheet applications may also be used.

A user interface 15 allows a user to interact with the spreadsheet. For example, cells, tables, charts and other objects of the spreadsheet may be selected and interacted with through the user interface. A spreadsheet application 24 supports a person object that represents a person or a group of persons. Spreadsheet manager 26 is configured to interact with one or more spreadsheet objects, including a person object, within a spreadsheet, such as spreadsheet 11. Spreadsheet manager 26 may be located externally from spreadsheet application 24 as shown or may be a part of spreadsheet application 24. Further, all/some of the functionality provided by spreadsheet manager 26 may be located internally/externally from spreadsheet application 24.

The person object may be used within a spreadsheet, such as spreadsheet 11, just as any other spreadsheet objects are utilized. For example, any operation that may be applied to another spreadsheet object may be applied to the person object. The person object may be integrated within spreadsheet formulas and other spreadsheet objects such as charts, tables, pivot tables, sheets, and the like. Spreadsheet formulas may perform operations specific to a person object. For example, in response to some condition occurring, an action relating to a person object may occur. Such as a message or alert may be automatically sent to a user, person objects may be sorted, one or more person objects may be added/deleted from the spreadsheet, information may be surfaced within the spreadsheet, status information for the person that is associated with the person may be obtained, and the like.

A person spreadsheet object may also be associated with one or more social networks, such as social network(s) 17. For example, social networking posts that are associated with a person object may be automatically included within a spreadsheet. A user of the spreadsheet may also post to a social network or some other network location (e.g. blog, web page, file) directly from within the spreadsheet. More details regarding the person spreadsheet object are disclosed below.

Figure 2:
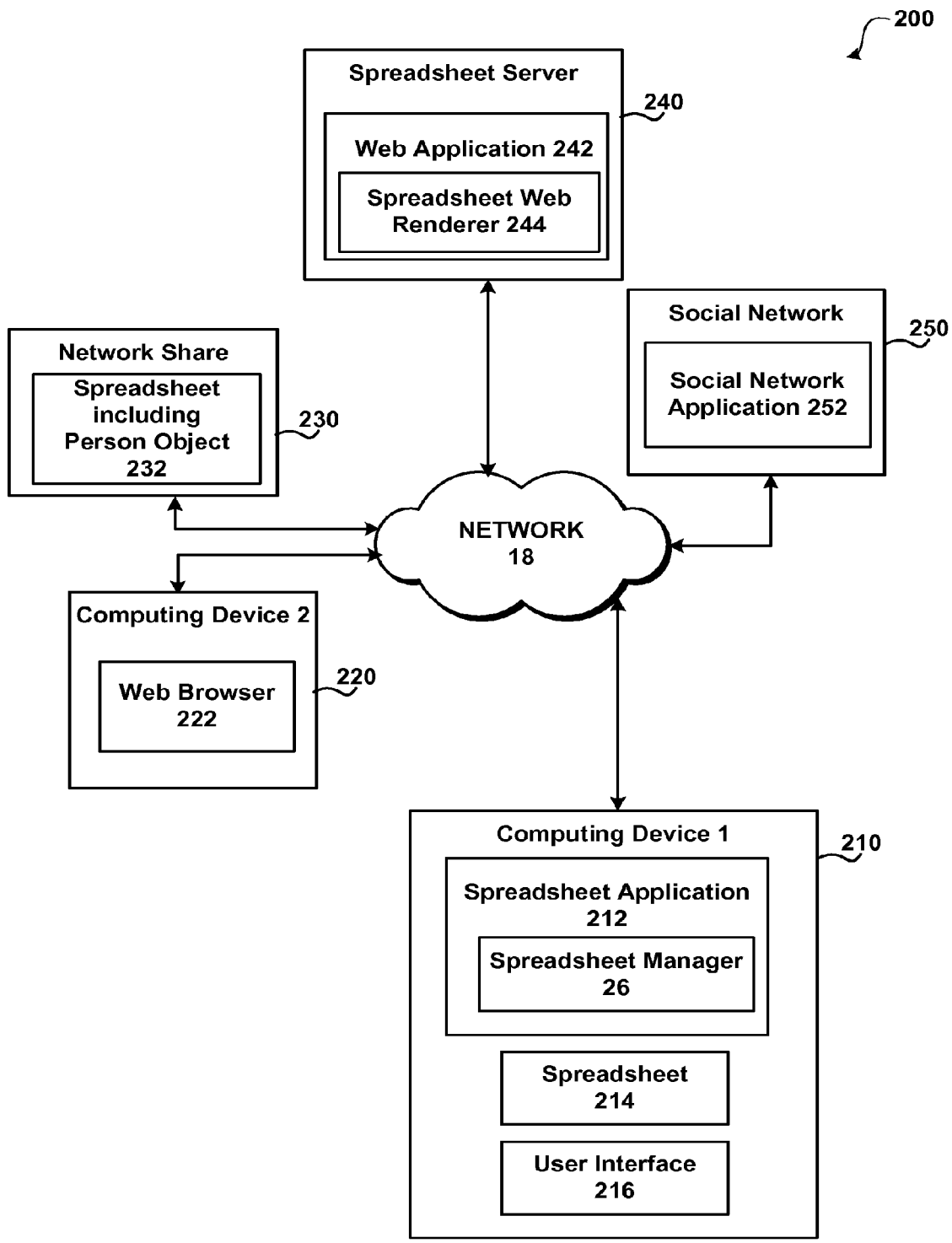
FIG. 2 shows a system for using person objects with a spreadsheet.

FIG. 2 shows a system for using person objects with a spreadsheet. As illustrated, system 200 includes computing device 1 (210), computing device 2 (220), network share 230, spreadsheet server 240 and social network 250.

The computing devices may be any type of computing device that is configured to perform the operations relating to interacting with spreadsheet objects. For example, some of the computing devices may be: mobile computing devices (e.g. cellular phones, tablets, smart phones, laptops, and the like); desktop computing devices and servers. Some computing devices may be arranged to provide an online cloud based service (e.g. interacting with spreadsheets online), some may be arranged as data shares, some may be arranged in local networks, some may be arranged in networks accessible through the Internet, and the like.

The computing devices are coupled through network 18. Network 18 may be many different types of networks. For example, network 18 may be an IP network, a carrier network for cellular communications, and the like. Generally, network 18 is used to transmit data between computing devices, such as computing device 1, computing device 2, network share 230, spreadsheet server 240 and social network 250.

Computing device 1 includes spreadsheet application 212, spreadsheet 214 and user interface 216. As illustrated, computing device 1 is used by a user to interact with a spreadsheet, such as spreadsheet 214, that comprises one or more person objects.

Spreadsheet 214 comprises different cells/spreadsheet objects including person objects, that may be interacted with using spreadsheet application 212. The spreadsheet may contain many different kinds of data or objects. For example, person objects, cells, tables, charts and other objects may be included within the spreadsheet.

User interface (UI) 216 is used to interact with a spreadsheet, such as spreadsheet 214. One or more user interfaces of one or more types may be used to interact with the spreadsheet. For example, UI 216 may be a context menu, a menu within a menu bar, a menu item selected from a ribbon user interface, a graphical menu, and the like. Generally, UI 216 is configured such that a user may easily interact with the spreadsheet, including person spreadsheet object(s). For example, when a person object is selected within spreadsheet 214 using user interface 216, one or more options may be presented to the user to interact with the person object and/or to perform an action relating to the person object. The options that are associated with a person object may include many different types of items and actions that include, but are not limited to: interacting with contact information, organization information, interests (e.g. hobbies, subjects . . . ); interacting with identifying information (age, school, groups . . . ); contacting the person that is represented by the person object, creating a formula relating to the person object; posting to one or more social networking sites or network locations, and the like. For example, a user may simply select an option within UI 216 that creates a new email message that is addressed to the person represented by the person object.

A network share 230 may be used to store information relating to one or more spreadsheets. Network share 230 is accessible by the computing devices that interact with a spreadsheet 232 that includes a person object. The network share may be associated with an online service that supports online access/interaction with the spreadsheet and spreadsheet objects. For example, spreadsheet server 240 may be configured as an online service to provide online users with the ability to interact/modify spreadsheets that include person objects.

A social network 250 may also be associated with a person object. For example, a person object may indicate that it is associated with social network 250 and that any posts that are placed on social network 250 are to be placed within one or more spreadsheets. A formula may also be included within the spreadsheet that automatically filters the posts to be placed within the spreadsheet. A user may also post to social network 250 and/or some other network location directly from a spreadsheet using formulas and/or a user interface.

Computing device 2 includes one or more applications, such as web browser 222 that may be configured to view/enter/interact with data/objects that are associated with a spreadsheet. For example, web browser 222 may be used to access spreadsheet server 240 to interact with spreadsheet 232 that includes a person object.

Spreadsheet server 240 includes web application 242 that comprises spreadsheet web renderer 244. According to an embodiment, spreadsheet server 240 is configured as a server that is located within an online service that is configured to provide services relating to displaying an interacting with spreadsheets. Web application 242 is configured for receiving and responding to requests relating to spreadsheet documents. For example, spreadsheet server 240 may access spreadsheet 232 including a person object stored on network share 230. Web application 242 is operative to provide an interface to a user of a computing device, such as computing device 2, to interact with a spreadsheet accessible via network 18. Web application 242 may communicate with a spreadsheet calculation server that is used for retrieving and calculating spreadsheets, such as the spreadsheet 232 stored at network share 230. The calculation server is configured to interact with and process operations relating to person objects.

Spreadsheet server 240 receives requests from computing devices, such as social network 250 and/or computing device 2. A computing device may transmit a request to spreadsheet server 240 to perform an action relating to a person object, such as viewing the spreadsheet that includes a person object. In response to such a request, the Web application 242 obtains the spreadsheet from a location, such as network share 230. The spreadsheet to display is converted into a markup language format, such as the ISO/IEC 29500 format. The spreadsheet may be converted by spreadsheet server 240 or by one or more other computing devices. Once the Web application 242 has received the markup language representation of the spreadsheet, the spreadsheet server utilizes the spreadsheet Web renderer 244 to convert the markup language formatted spreadsheet into a representation of the spreadsheet that may be rendered by a Web browser application, such as Web browser 222 on computing device 2. The rendered spreadsheet appears substantially similar to the output of the spreadsheet application 212 on computing device 1 when utilized to view the same spreadsheet. Once the spreadsheet Web renderer 244 has completed rendering the file, it is returned by the spreadsheet server 240 to the requesting computing device, such as computing device 2, where it may be rendered by the Web browser 222.

The spreadsheet Web renderer 244 is also configured to render into the markup language file one or more scripts for allowing the user of a computing device, such as computing device 2 to interact with the spreadsheet within the context of the Web browser 22. Spreadsheet Web renderer 244 is operative to render script code that is executable by the Web browser application 222 into the returned Web page. The scripts may provide functionality, for instance, for allowing a user to change a view of the spreadsheet and/or to modify values that are related to the spreadsheet. In response to certain types of user input, the scripts may be executed. When a script is executed, a response may be transmitted to the spreadsheet server 240 indicating a spreadsheet object within the spreadsheet that has been acted upon, to identify the type of interaction that was made, and to further identify to the Web application 242 the function that should be performed upon the appropriate spreadsheet object.

Figure 3:
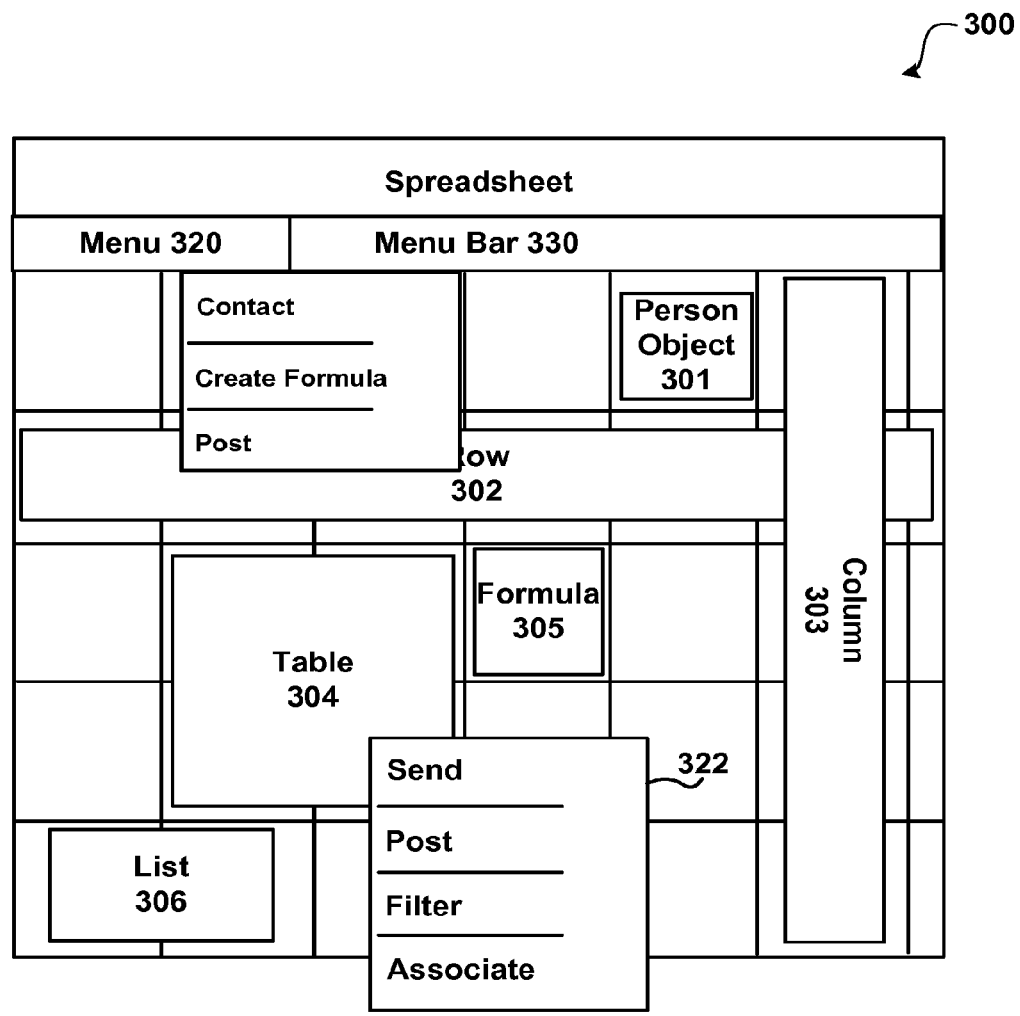
FIG. 3 shows a spreadsheet comprising different spreadsheet objects including one or more person objects.

FIG. 3 shows a spreadsheet comprising different spreadsheet objects including one or more person objects. As illustrated spreadsheet 300 shows different user interfaces, menus, and spreadsheet objects including person object 301, row 302, column 303, table 304, formula 305 and list 306. While only one object of each type is shown, more or fewer objects may be included within spreadsheet 300. Other types of objects/data may also be included within spreadsheet 300.

Spreadsheet 300 includes a grid having rows and columns. The columns and rows define the workspace for the currently selected workbook. Each of the cells defined by a particular row and column combination can be edited with numerical or text data and commands may be performed on the various cells to perform virtually unlimited types of analysis operations.

Spreadsheet 300 also includes various user interface elements for navigating within the currently selected spreadsheet or within other spreadsheets within the currently selected workbook. Spreadsheet 300 also shows exemplary user interfaces that may be used for interacting with one or more spreadsheet objects, such as menu 320 and menu 322. Menu 320 is a menu that is contained within menu bar 330. When menu 320 is selected various options are available to be selected. The options may comprise a variety of options, such as options relating to a person object including contacting a person, creating a formula that is associated with the person object, posting to a social network, and other options (not shown). A context menu may also be used to receive the sharing options. For example, a user may right click on Table 304 which displays context menu 322. As illustrated, context menu 322 includes a send option, a post option, a filter option, and an associate option. The send option creates a message to send the table to a person. The post option posts the table to a network location, such as a social network. The filter option may be used to sort the table and/or change a display of the table based on a person object field(s). The associate option configures the table to be associated with a person object, such that a view of the spreadsheet is changed to emphasize the table when the person represented by the person object views the spreadsheet.

According to an embodiment, other native spreadsheet objects (e.g. charts, tables, pivot tables, lists, and the like) are extended to define behaviors for those spreadsheet objects that are specific to a person object. For example, a list may include a behavior to sort the list on a field of a person object (i.e. show people above a certain age, show people that are in a certain group, sort on the age).

FIGS. 4-12 show exemplary spreadsheet person objects. FIGS. 4-12 are for exemplary purpose and are not intended to be limiting.

Figure 4:
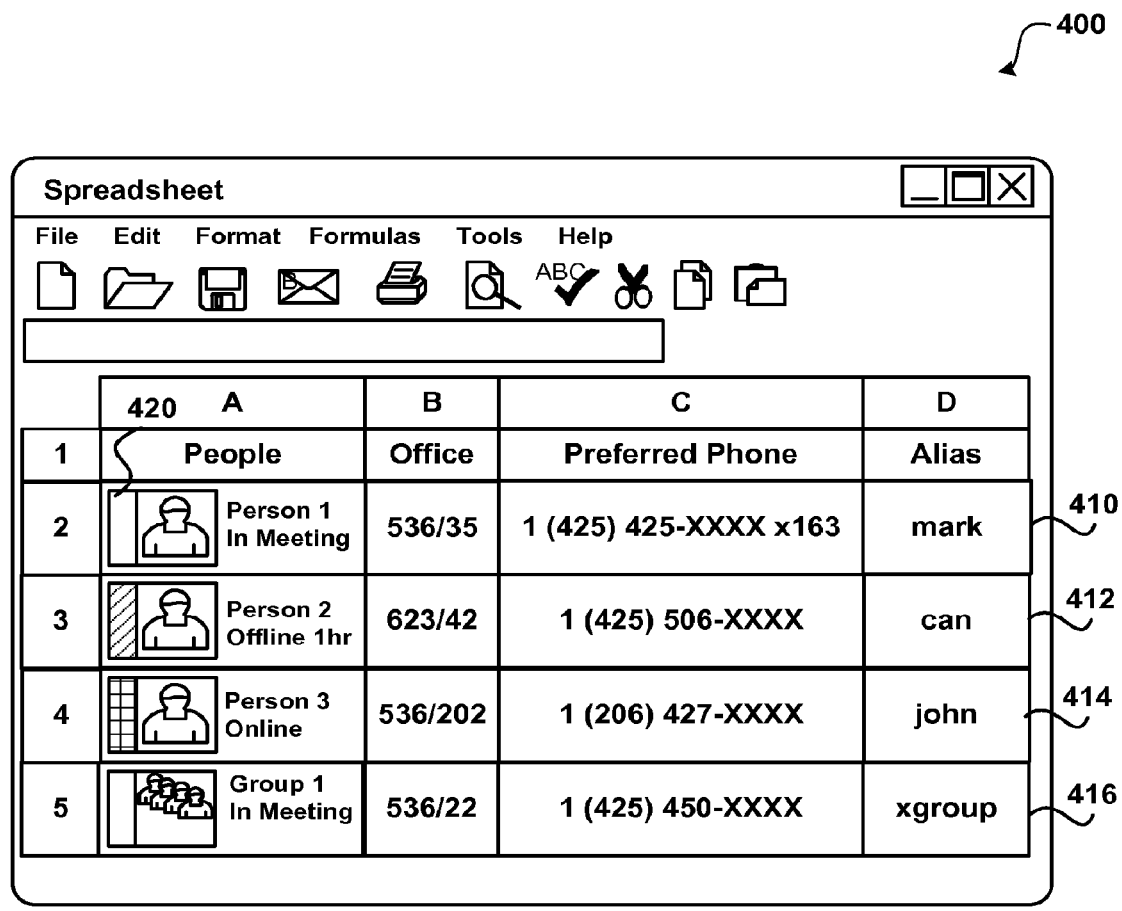
FIG. 4 illustrates an exemplary spreadsheet including person objects.

FIG. 4 illustrates an exemplary spreadsheet including person objects. As illustrated, FIG. 4 comprises a spreadsheet that includes four person objects in four rows of the spreadsheet.

Row 410 shows a person object (Person 1) in column A Row 412 shows a person object (Person 2) in column A Row 414 shows a person object (Person 3) in column A Row 416 shows a person object that represents a group of people.

Each person object comprises core methods for performing operations relating to the person object and extensible methods/fields that may be added to the person object. For example, a user may add one or more fields/operations to a person object. These fields and operations may be any item that is related to a person (e.g. club affiliations, political party, school, grade, marital status, income level, and the like). The person object can be used to automate the spreadsheet application just as any other spreadsheet object can be used.

Each person object may also be included in one or more formulas within a spreadsheet. For example, when a person object is added to a spreadsheet, a formula may specify to automatically add information to the spreadsheet. In the current example, when a person object is added (automatically/manually) to the spreadsheet, office information, a preferred phone number is obtained, and an alias is automatically added to the spreadsheet (see columns B, C and D). The information placed within the spreadsheet of the current example is obtained from a base field of the person object (See FIG. 5 for exemplary base fields of the person object). Information may also be obtained from other locations. For example, when a person object is inserted within a spreadsheet, a formula may specify to automatically display their co-workers, their open tasks, a list of messages, posts from a social network they are associated with, and the like.

As illustrated, each person object is graphically depicted. For example, a person object may include an icon to represent the person, a picture of the person, or some other indicator that identifies the object as a person.

A status indicator (420) may also be displayed with the person object. The status indicator shows a current availability status of the user. As illustrated, person 1 is in a meeting, person 2 has been offline for one hour, person 3 is online, and group 1 is in a meeting. A name, or some other information, may also be displayed near the person object. In the current example, the person object includes a name of the person and a status description.

Figure 5:
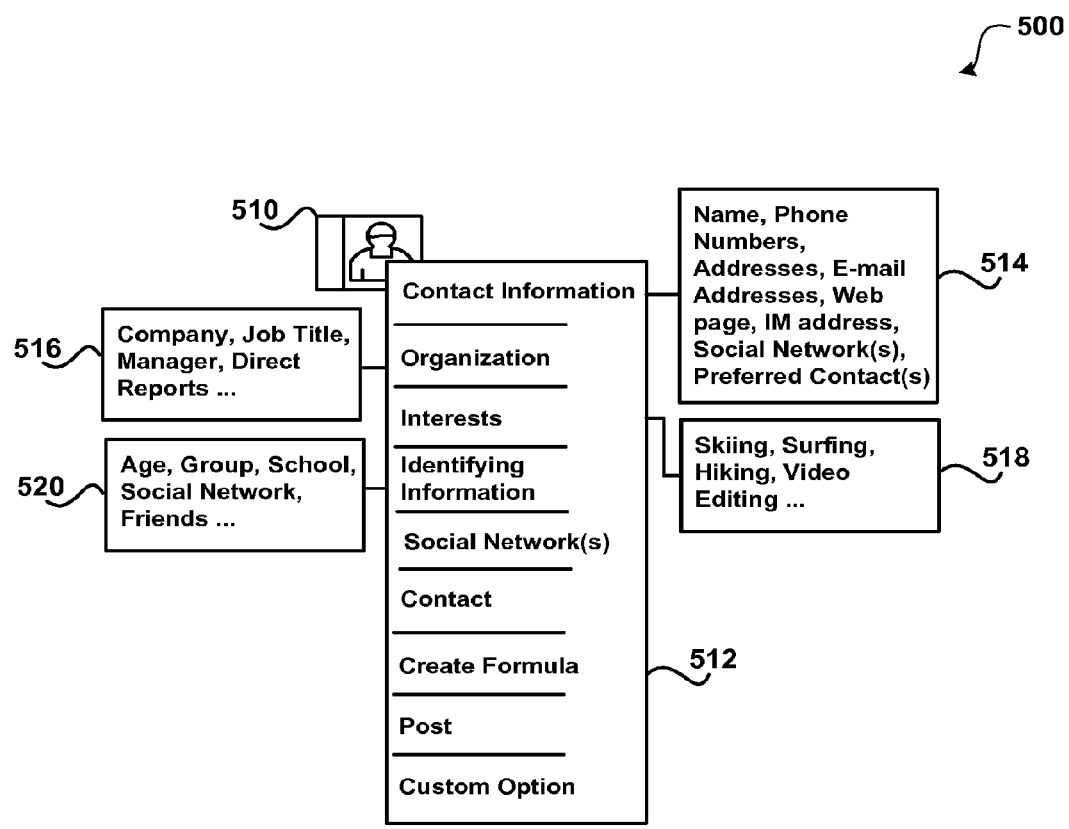
FIG. 5 shows a person object including fields and options that are associated with a person object.

FIG. 5 shows a person object including fields and options that are associated with a person object.

A person object has base fields that are common to all of the person objects. Different implementations of the person object may have a different number of base fields that are included. As illustrated, a person object comprises all/some of the following: contact information, organization information, interest information, identifying information and social network information.

Contact information includes contact information that may be used to contact the person. For example, the contact information may include some/all of the following information: name, phone number(s), addresses, e-mail(s), web addresses, Instant Message address, social network IDs and preferred contact method(s).

Organization information includes information relating to one or more organizations as to which the person is a part of. For example, the organization information may include some/all of the following information: company information, department information, job title, organization, manager, direct reports, and the like.

Interest information includes information relating to the person's interests. For example, the interest information may include that the person likes skiing, surfing, hiking and video editing.

Social network information includes information relating to the social networks to which the person is associated with. The information may include the names of the social network(s), information (e.g. token, identifying information) that is used to obtain/post information from/to the social network as well as other information relating to the site. The social network information may also be used to identify other network locations for which the user would like to associate a person object (e.g. blog, web page, file).

Various options may also be associated with a person object. As illustrated, a contact option, a create formula option, a post option, and a custom option is included. More or fewer options may be included. Selecting one of the options performs the option. For example, selecting the contact method will create a new message to the person represented by the person object.

The contact option may be the preferred contact method (i.e. email, phone, IM) or the user may select a different contact method.

The create formula option associates a formula with the person object. The formulas may be created in the same manner as creating formulas for other objects within the spreadsheet. The formula may be used to read information from a person object, write information to a person object, perform one or more actions on a person object (e.g. send email to person, send notification, etc.). The formulas integrate with the other formulas in the spreadsheet. In other words, the person object may be included in a formula in the same manner as any other spreadsheet object. Many different types of formulas may be developed to interact with a person object. The following are a few exemplary uses of formulas that interact with a person object.

Suppose that a spreadsheet includes a number of persons that are responsible for performing a task. A formula may be created specifying that when the number of tasks for a person is more than a predetermined amount, then an email is sent to that person. This formula may fire automatically.

Suppose that a user desires to keep track of the people in their organization. A formula may be created to obtain the people who report to a manager and display corresponding person objects in the spreadsheet. One or more other formulas may be used to perform some other action using the obtained person objects (e.g. display preferred contact method, alias, sort, and the like). Whenever the list changes, the spreadsheet is automatically updated.

Suppose that a user has a list of people on their team that is included in the spreadsheet. A formula may be created in the spreadsheet to automatically send an 'invite to collaborate' email when someone new joins the team. When the person is added to the list in the spreadsheet the formula executed and the collaborate email is sent.

The post option posts information to one or more social networks, blogs, or some other web address that is identified. For example, selecting the post option may post a comment to a social network, may post a section of a spreadsheet to the social network, or may post other identified information to the network location.

The custom option allows a user to extend the available options. For example, a user may create a task option that when selected shows the current tasks assigned to the user. Another option might show a list of messages received within the last day. Another option might show a list of persons who have completed a project. Another option might show a list of upcoming meetings. As can be seen, the custom options may relate to almost anything that may be associated with a person. The custom options may be associated with a formula, a macro and/or other code that is used to perform the operation.

Figure 6:
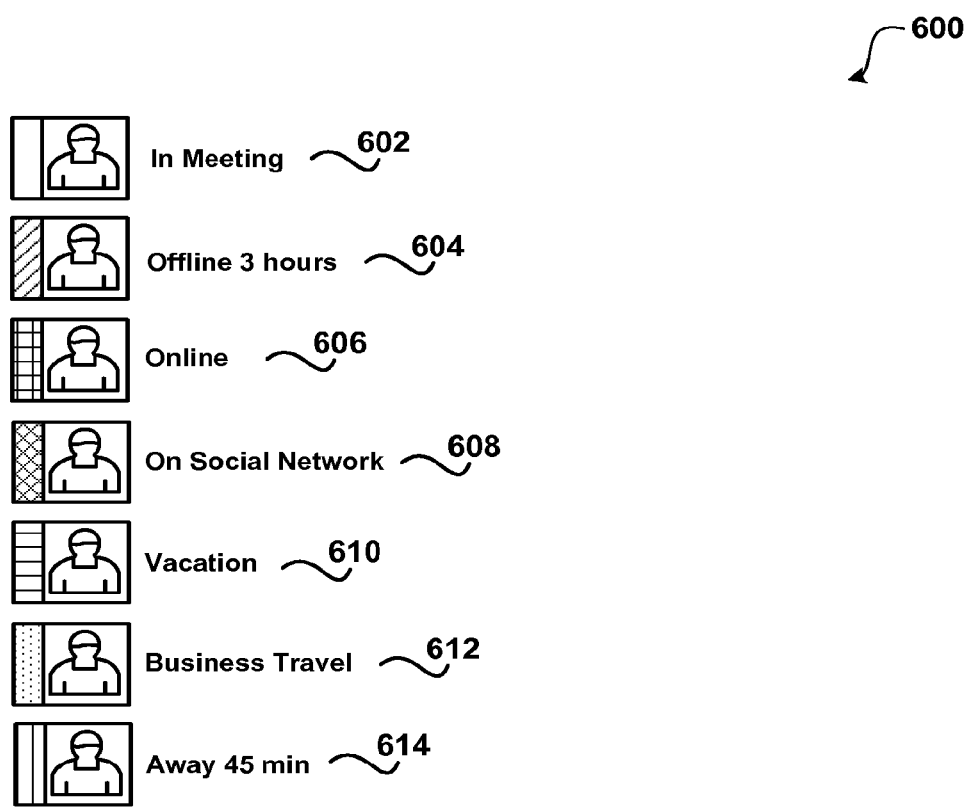
FIG. 6 illustrates different status indicators for a person object.

FIG. 6 illustrates different status indicators for a person object. Display 600 includes different status indicators that may be used to represent a status of a person. More/fewer status indicators may be included. Status indicator 602 shows that a person is in a meeting. Status indicator 604 shows that a person is offline. Status indicator 606 shows that a person is online. Status indicator 608 shows that a person is on a social network. Status indicator 610 shows that a person is on vacation. Status indicator 612 shows that a person is on business travel. Status indicator 614 shows that a person is away. Other indicators may also be used. For example, a color of the representation of the person object may change color, a shape of the person object may change, a text description may be illustrated to show the status, an audible indication may be used to indicate the status, and the like.

Figure 7:
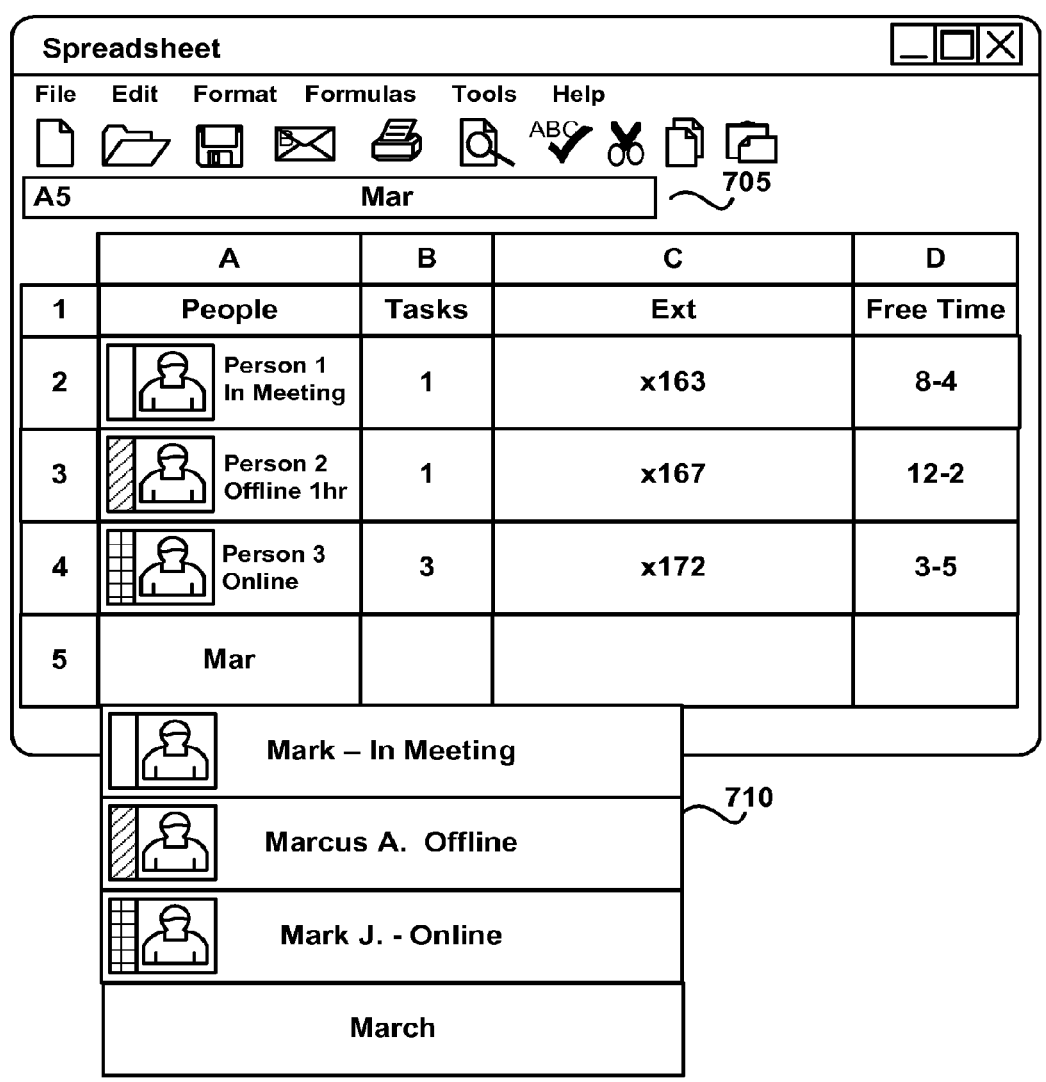
FIG. 7 shows an exemplary spreadsheet in which a user is entering a name into a cell of the spreadsheet.

FIG. 7 shows an exemplary spreadsheet in which a user is entering a name into a cell of the spreadsheet. As illustrated, spreadsheet 700 includes an entry box 705 in which the user has entered "Mar." In response to the user entering one or more letters into entry box 705, list 710 is displayed that shows possible matches for the entry. List 710 may comprise person objects and non-person objects. For example, list 710 includes three person objects and another object (March) that may match the entry in entry box 705. Selecting one of the entries in list 710 places the object within the cell which in this case is cell A5. As discussed above, when a person object is placed within a cell, other spreadsheet information may be automatically populated. In the current example, the information populated is the number of tasks that are pending for the person, an extension at which the person may be reached, and the times the person is available during the day.

Figure 8:
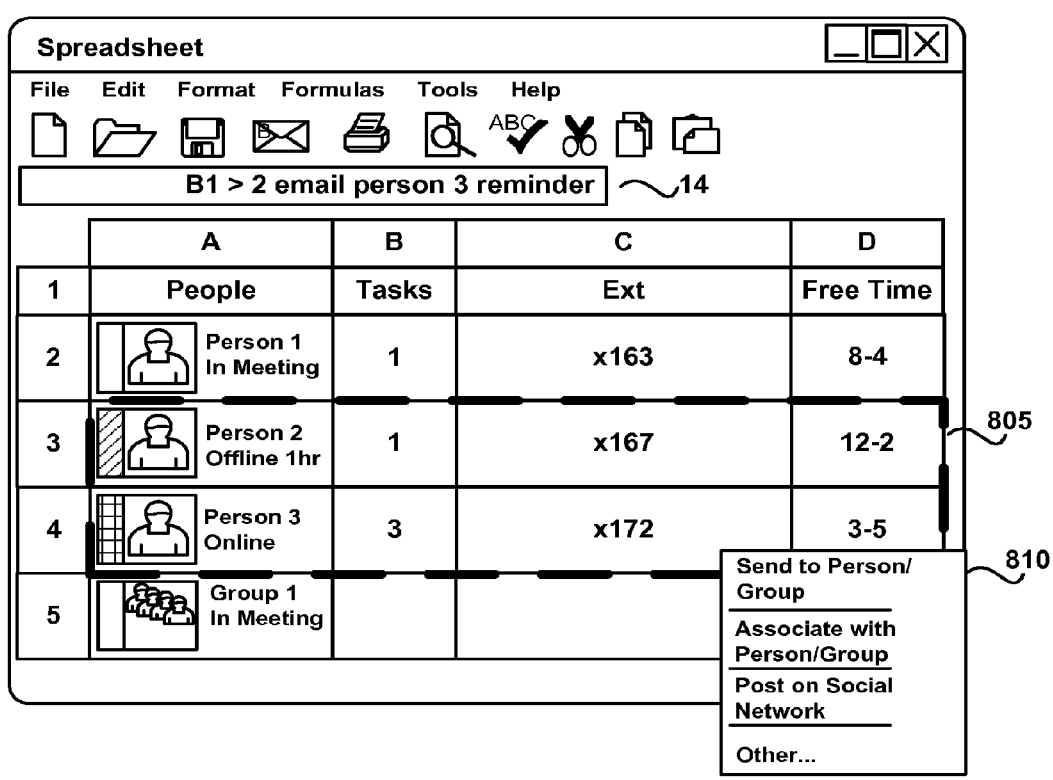
FIG. 8 illustrates performing an action that is associated with a person object for a selected portion of a spreadsheet.

FIG. 8 illustrates performing an action that is associated with a person object for a selected portion of a spreadsheet.

As illustrated, a user has selected a portion of the spreadsheet as indicated by box 805. A user may select any amount of the spreadsheet. For example, a user may select a single cell, a portion of the spreadsheet, or the entire spreadsheet. A user may perform many different operations relating to the selection. Some of these operations are associated with one or more person objects. According to an embodiment, when a user right clicks on the selection, a context menu 810 that comprises different options that may be selected. As illustrated, context menu 810 includes an option to send the selection to a person object (that may represent a group), an option to associate the selection with a person/group, an option to post the selection on a social network (or some other network location), and an option to perform some other option that is not directly specified within the menu. Selecting one or more person objects may indicate to create a new message to send to the selected people.

The send to person option sends a message to the user that includes the information and/or a link to the information that is selected.

The associate with a person option may associate the selected portion of the spreadsheet with a user such that when they view the spreadsheet that user is first shown the selected portion of the spreadsheet. For example, a spreadsheet may be very large but only a certain portion of the spreadsheet is relevant to a user. In this case, the user may select the portion of the spreadsheet that is relevant to a user and then associate that portion with the user. When the associated user opens the spreadsheet the associated portion of the spreadsheet is displayed.

The post on social network option may post the selected portion to a social network and/or some other network location (e.g. web site, blog . . . ).

Figure 9:
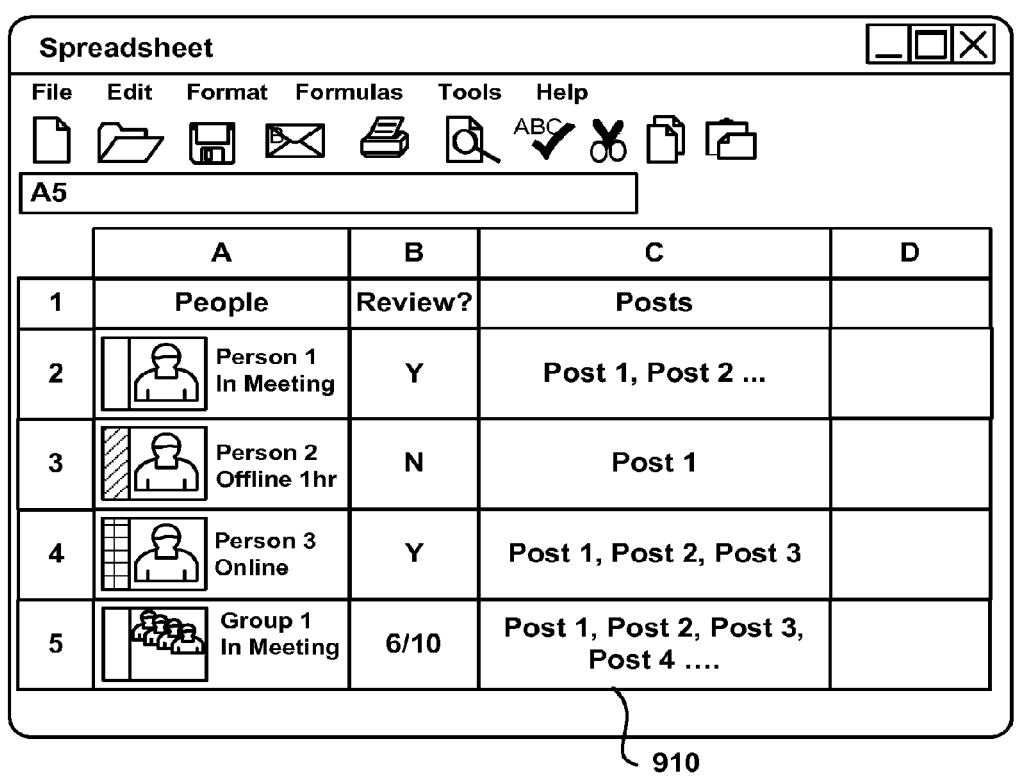
FIG. 9 shows a spreadsheet that includes posts obtained from a social network.

FIG. 9 shows a spreadsheet that includes posts obtained from a social network. As illustrated, spreadsheet 900 includes 4 person objects that includes a people column, a review column and a posts column.

The posts column shows posts that the person has made on their social network, blog, web site, file, or some other network location. The information may be automatically/manually retrieved from the network location. The social network (or other network location) may also send the information directly to the spreadsheet application for integration. The posts may be all the posts made by the person and/or filtered based on a formula that is associated with the cell/column. For example, the user may specify that the only posts they want displayed are directed to the current user of the spreadsheet.

The review column shows the use of a formula to determine whether a person has reviewed an item. The item may be a document, a task, a proposed date for a meeting, and the like. As illustrated, person 1 and person 3 have reviewed the item, person 2 has not reviewed the item and 6/10 persons that are associated with group 1 have reviewed the item. According to an embodiment, selecting the person object that is associated with the group expands the display to include a display for each person represented by the group. In this way, the user may see which members of the group have reviewed the item and which have not.

Figure 10:
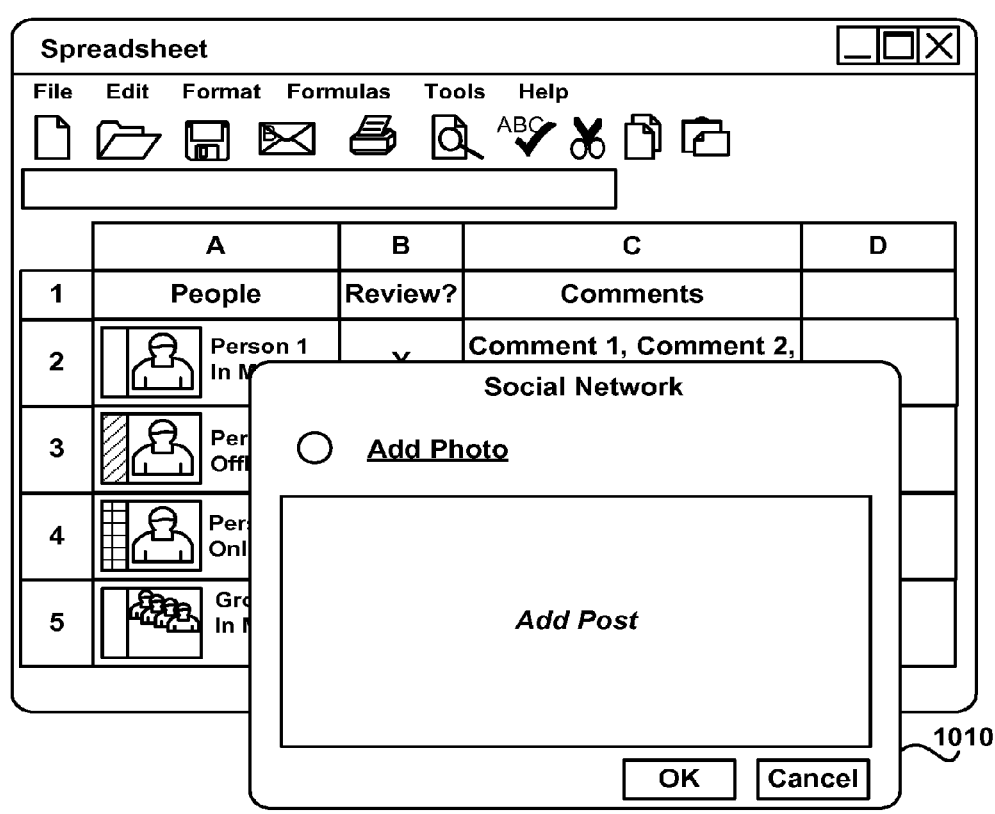
FIG. 10 illustrates adding a post to a social network.

FIG. 10 illustrates adding a post to a social network. As illustrated, spreadsheet 1000 includes interface 1010 that allows a user to enter a post that is posted to a social network. The post may be directed to a single person, a group of persons and/or posted on a wall of the user. Interface 1010 may be displayed in response to various actions. For example, a user may select a menu option, right click on a person object, hit a shortcut key, and the like. Once the user has added their content, the post is made to the social network. As discussed, the post may be to a social network, a blog, a file, a website and/or to some other network location.

Figure 11:
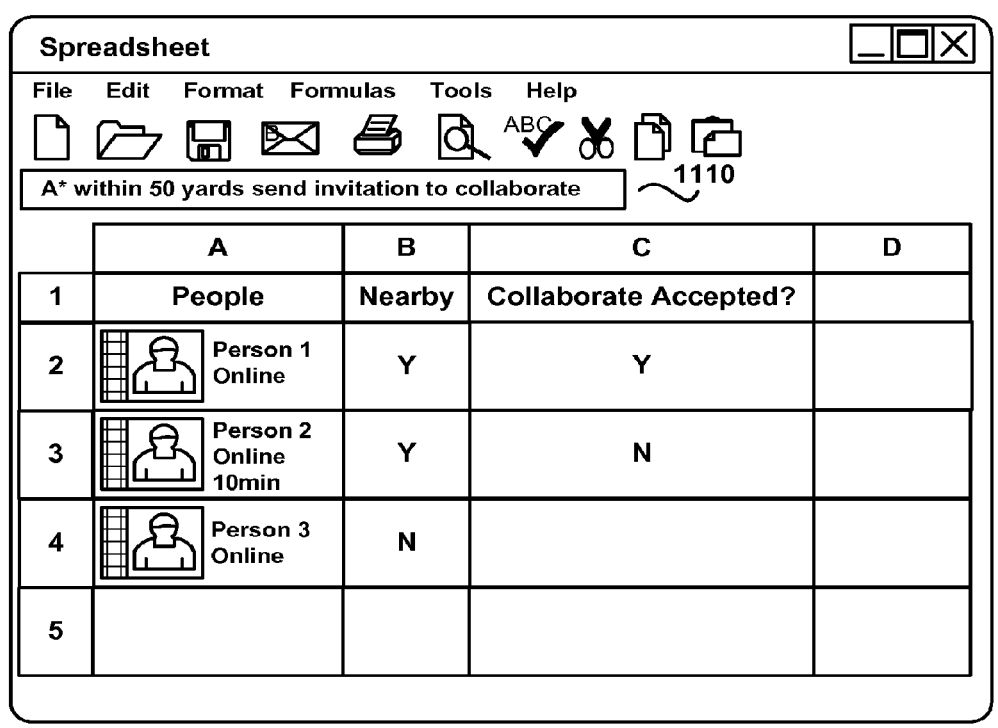
FIG. 11 shows a spreadsheet including person objects that show when a person object is nearby.

FIG. 11 shows a spreadsheet including person objects that show when a person object is nearby. As illustrated, spreadsheet 1100 displays when a person that is represented by a person object within the spreadsheet is nearby. For example, a formula may be specified (1110) that defines a person is nearby when they are within 50 yards of the open spreadsheet 1100 and when they are nearby an invitation is sent to the person asking if they would like to collaborate with the user of the spreadsheet. In the current example, the user has created a column (B) showing when a person is nearby and a column (C) indicating whether or not a user has accepted to collaborate with the user. The distance that a person is considered nearby may be predefined and/or defined by a user (such as in a formula).

Figure 12:
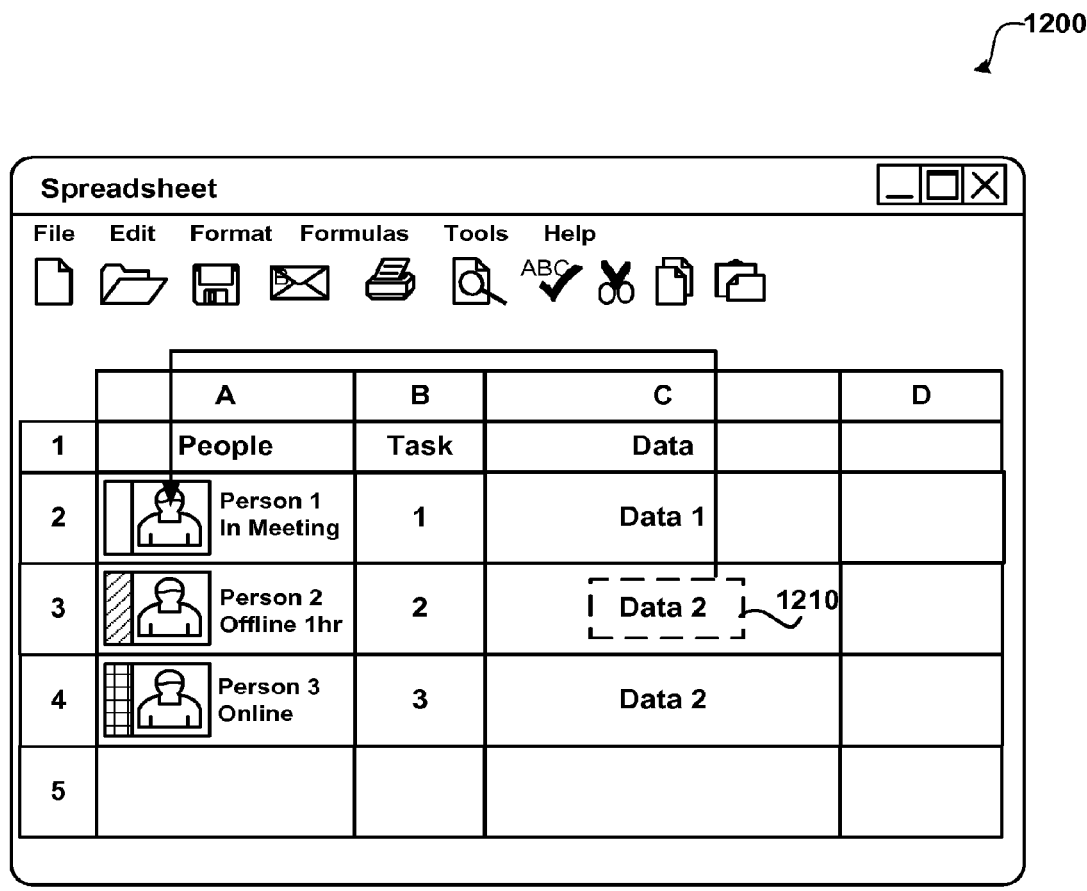
FIG. 12 illustrates a user selecting a portion of a spreadsheet and dropping it on a person object.

FIG. 12 illustrates a user selecting a portion of a spreadsheet and dropping it on a person object. As illustrated, spreadsheet 1200 shows a user selecting Data 2 (1210) and dragging and dropping it onto person 1. In response to the user dropping data/spreadsheet object onto a person object an action may be performed by the spreadsheet application. For example, the data/object may be sent to the user, the data may be posted to a network location, the data may be associated with the user, and/or some other action may occur. A default action may be specified that defines the action to occur when data/object(s) are dropped onto a person object. The default action may be changed by a user and may be associated with all/portion of the person objects. For example, for some people the default action may be to post to a social network whereas for other users the default action may be to send the data to the person. The action that occurs may also be context dependent. For example, when a user drops a picture on an object this may indicate to post to a social network whereas when a user drops a document on the person this may indicate to email the document or a link to the document to the user.

Figure 13:
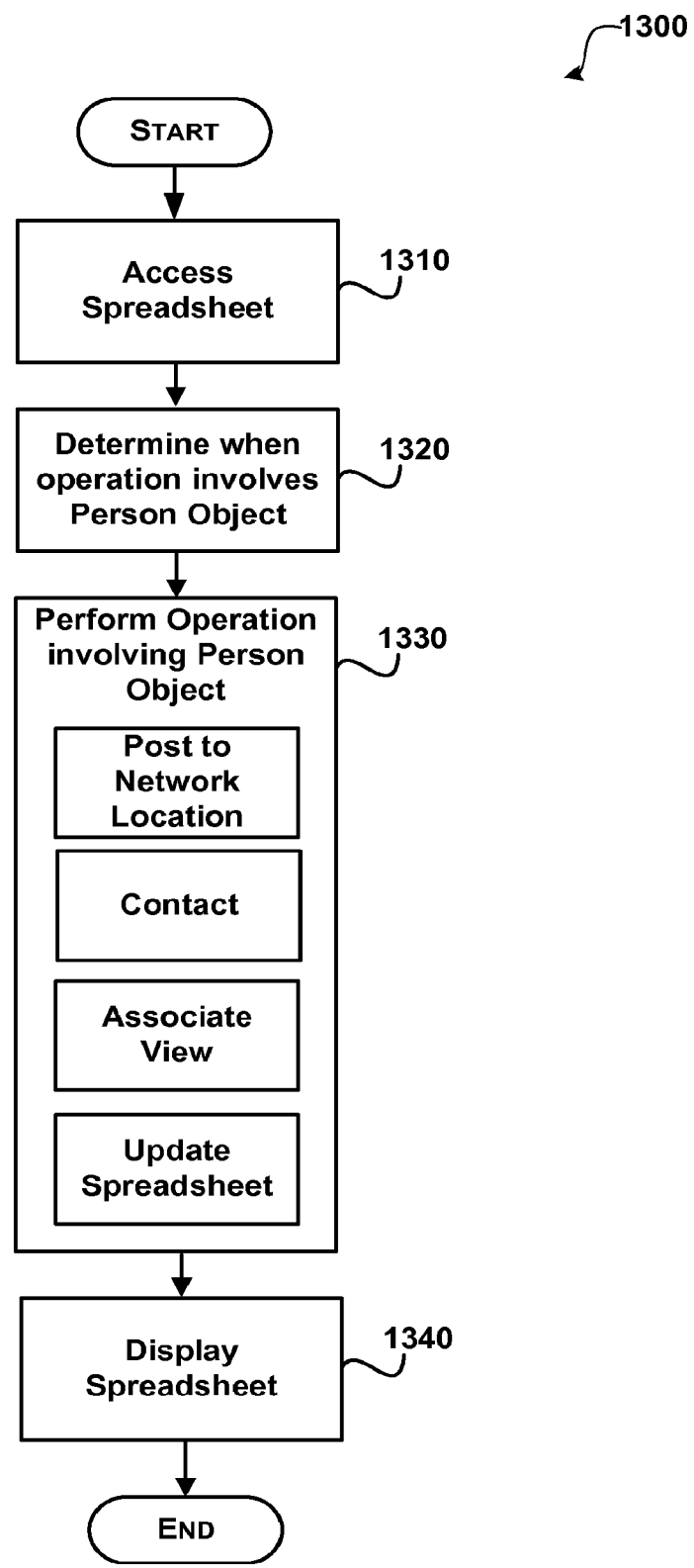
FIG. 13 shows an illustrative process for representing a person within a spreadsheet.

Referring now to FIG. 13 an illustrative process for representing a person within a spreadsheet will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start block, process 1300 moves to operation 1310, where a spreadsheet is accessed that includes one or more person objects. According to an embodiment, the person objects are native to the spreadsheet application and the person object(s) may be acted upon in the same manner as any other spreadsheet objects within the spreadsheet. According to an embodiment, the person object includes some/all of the following fields including a name field, a contact field, an organization field, a social network field, an interests field and an identifying information field (e.g. age, birth date). Other fields may also be included. Default actions may also be associated with a person object. According to an embodiment, the person object includes some/all of the following default actions including a contact action, a create formula action, a post action, and a custom action.

Moving to operation 1320, a determination is made as to when an operation in the spreadsheet involves a person object. The determination may be made in response to a direct user action, a result of an execution of a formula, a message received from another application, and the like.

Flowing to operation 1330, the operation is performed that involves the person object. For example, the operation may include posting information to a network location, contacting one or more persons (e.g. email, phone, IM, SMS), associating a view of a spreadsheet with a person, and updating a display of the spreadsheet. The spreadsheet may be updated in many different ways. For example, when a new person joins a group, a person object representing the person may be automatically added to the spreadsheet. Other information may also be added/deleted. For example, when a person object is automatically/manually added to the spreadsheet, other columns/rows may be populated (e.g. preferred contact information, task information, status information . . . ). The status of the person object may also be updated. The status may be updated automatically/manually. For example, calendar information may be kept for a person that is used to update when that person is in a meeting, on vacation, traveling for business and the like. A person may also indicate their status manually. For example, a person may change a field using a user interface to indicate their status.

Transitioning to operation 1340, the spreadsheet is displayed. According to an embodiment, the person object is represented by a graphical representation (e.g. picture/icon) of the person including status information for the person.

The process then flows to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer system, comprising:
  at least one processing unit; and
  at least on memory storing computer-readable instructions that when executed by the at least one processing unit cause the computer system to perform a method for representing a person within a spreadsheet, the method comprising:
    accessing a spreadsheet, the spreadsheet comprising:
      a person object, wherein the person object comprises a plurality of fields including at least a name and a contact action; and
      one or more native spreadsheet objects, wherein the one or more native spreadsheet objects comprise at least one of a chart object and a table object;
    determining that a spreadsheet operation involves the person object; and
    in response to determining that the spreadsheet operation involves the person object, configuring a view of the spreadsheet based on a person represented by the person object, wherein configuring the view comprises:
      filtering or sorting the one or more native spreadsheet objects based on the person represented by the person object, and
      providing a context menu based on the person represented by the person object.

2. The computer system of claim 1, wherein the person object comprises a graphical representation of the person.

3. The computer system of claim 2, wherein the person object comprises a graphical status indicator that indicates an availability of the person, and wherein the graphical status indicator is configured to change a color or a shape of the graphical representation of the person based on changes in the availability of the person.

4. The computer system of claim 1, further comprising:
  determining that a data object in the spreadsheet is associated with the person object;
  in response to determining that the data object is associated with the person object, identifying a predetermined rule, wherein the predetermined rule is defined based on a data category of the data object; and
  performing a spreadsheet operation involving the person object based at least in part on the predetermined rule.

5. The computer system of claim 4, wherein the spreadsheet operation treats the person object in a same manner as the one or more native spreadsheet objects, and wherein the person object is acted upon in a same manner as the one or more native spreadsheet objects.

6. The computer system of claim 1, wherein the plurality of fields of the person object further comprises one or more of:
a field for a social network to which the person belongs;
a field for organization information comprising one or more of: a company and a manager;
a field for one or more of: a birth date and an interest; and
a field identifying a location of the person.

7. The computer system of claim 1, further comprising:
receiving a selection of a portion of the spreadsheet and associating the selected portion with the person object, wherein when the person that is represented by the person object views the spreadsheet the selected portion is displayed.

8. The computer system of claim 1, wherein performing the spreadsheet operation involving the person object comprises displaying a post from a social network within the spreadsheet that is associated with the person object.

9. The computer system of claim 1, wherein performing the spreadsheet operation involving the person object comprises selecting an option within a graphical user interface of the spreadsheet that is used to post data to a social network.

10. The computer system of claim 1, further comprising:
including the person object within a formula; and
in response to a condition specified by the formula, performing an action relating to the person object.

11. The computer system of claim 1, further comprising:
performing at least one of the following actions when data is dropped onto the person object:
sending a link to the data to the person;
sending the data to the person; and
posting the data to a network location.

12. The computer system of claim 1, further comprising:
determining when a post is made to a social network that is related to each of the person objects within the spreadsheet; and
displaying the posts within the spreadsheet.

13. A computer-implemented method for representing a person within a spreadsheet, the method comprising:
accessing a spreadsheet, the spreadsheet comprising:
a person object, wherein the person object comprises a plurality of fields including at least a name and a contact action; and
one or more native spreadsheet objects, wherein the one or more native spreadsheet objects comprise at least one of a chart object and a table object;
determining that a spreadsheet operation involves the person object; and
in response to determining that the spreadsheet operation involves the person object, configuring a view of the spreadsheet based on a person represented by the person object, wherein configuring the view comprises:
filtering or sorting the one or more native spreadsheet objects based on the person represented by the person object, and
providing a context menu based on the person represented by the person object.

14. The computer-implemented method of claim 13, wherein the person object comprises a graphical representation of the person and a graphical status indicator that indicates an availability of the person, and wherein the graphical status indicator is configured to change a color or a shape of the graphical representation of the person based on changes in the availability of the person.

15. The computer-implemented method of claim 13, further comprising:
determining that a data object in the spreadsheet is associated with the person object;
in response to determining that the data object is associated with the person object, identifying a predetermined rule, wherein the predetermined rule is defined based on a data category of the data object; and
performing a spreadsheet operation involving the person object based at least in part on the predetermined rule.

16. The computer-implemented method of claim 13, further comprising:
receiving a selection of a portion of the spreadsheet and associating the selected portion with the person object, wherein when the person that is represented by the person object views the spreadsheet the selected portion is displayed.

17. The computer-implemented method of claim 13, wherein performing the spreadsheet operation involving the person object comprises displaying a post from a social network within the spreadsheet that is associated with the person object.

18. A computer system, comprising:
at least one processing unit; and
at least on memory storing computer-readable instructions that when executed by the at least one processing unit cause the computer system to:
access a spreadsheet, the spreadsheet comprising:
a person object, wherein the person object comprises a plurality of fields including at least a name and a contact action; and
one or more native spreadsheet objects, wherein the one or more native spreadsheet objects comprise at least one of a chart object and a table object;
determine that a spreadsheet operation involves the person object; and
in response to determining that the spreadsheet operation involves the person object, configure a view of the spreadsheet based on a person represented by the person object, wherein configuring the view comprises:
filter or sorting the one or more native spreadsheet objects based on the person represented by the person object, and
provide a context menu based on the person represented by the person object.

19. The computer system of claim 18, wherein the person object comprises a graphical representation of the person, wherein the person object comprises a graphical status indicator that indicates an availability of the person, and wherein the graphical status indicator is configured to change a color or a shape of the graphical representation of the person based on changes in the availability of the person.

20. The computer system of claim 18, further comprising:
determine that a data object in the spreadsheet is associated with the person object;
in response to determining that the data object is associated with the person object, identify a predetermined rule, wherein the predetermined rule is defined based on a data category of the data object; and
perform a spreadsheet operation involving the person object based at least in part on the predetermined rule.

* * * * *